UNITED STATES PATENT OFFICE.

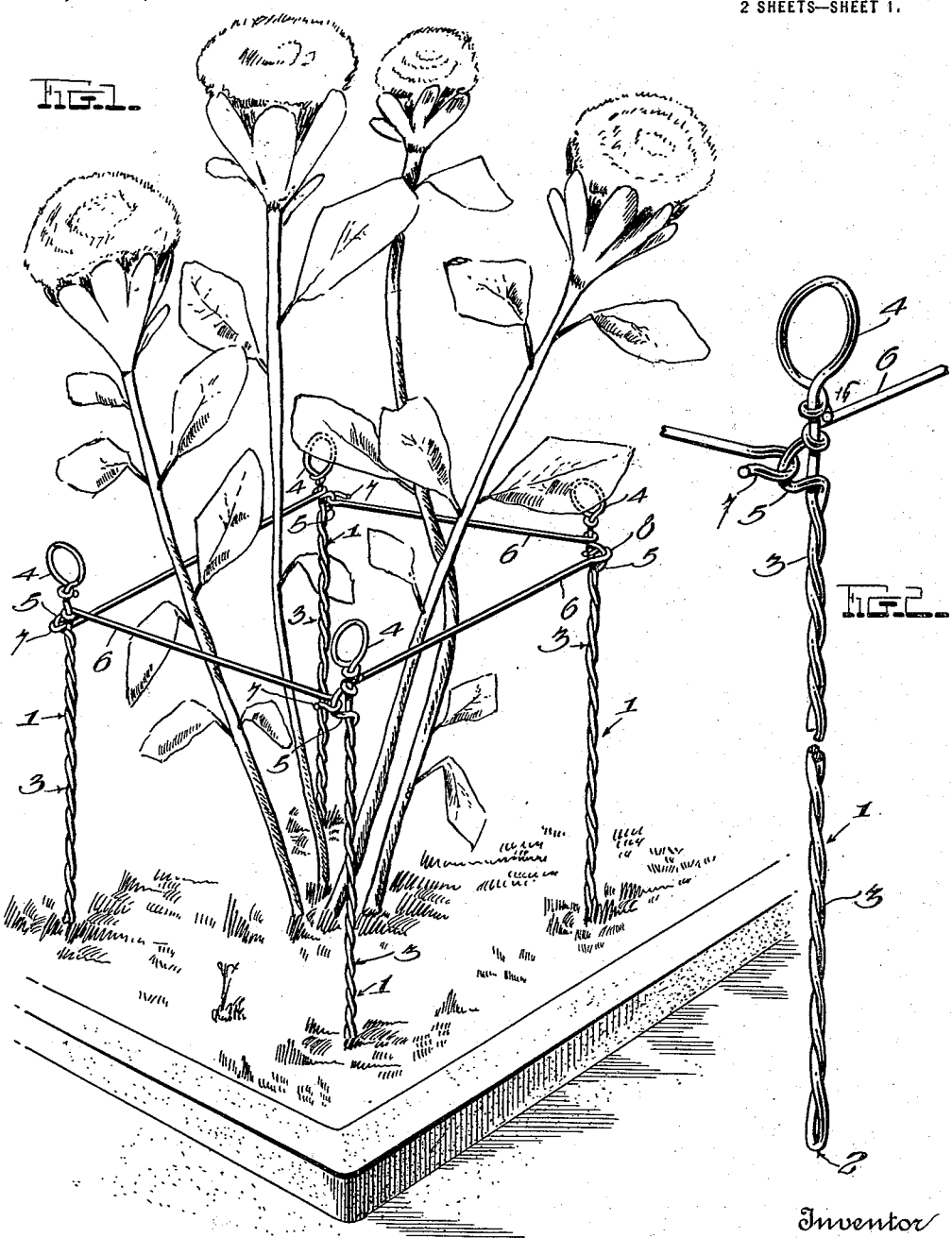

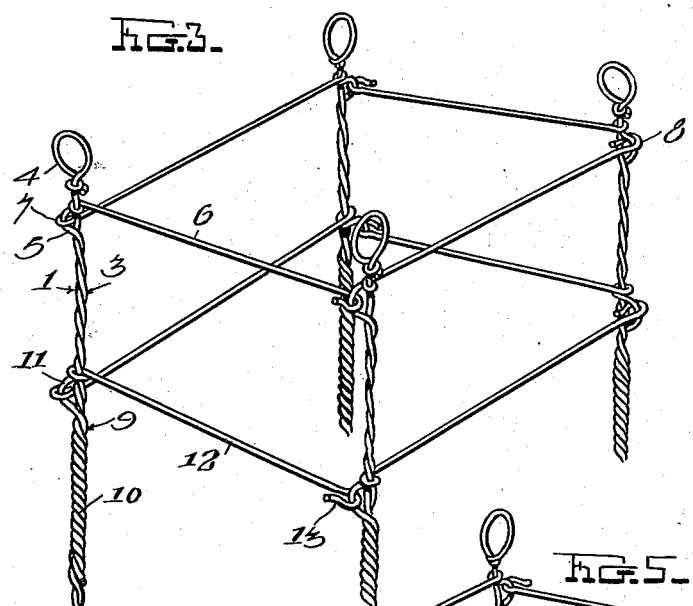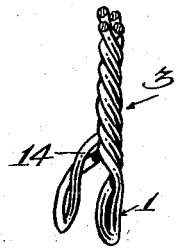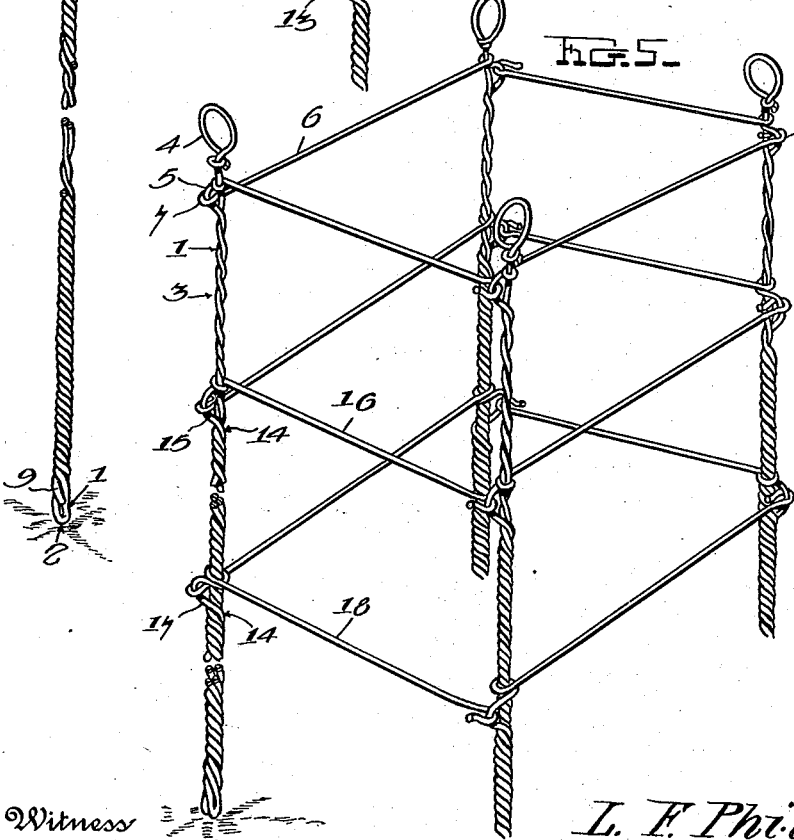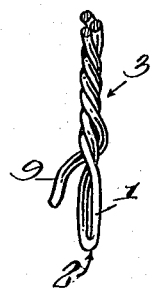

LOUIS FREDERICK PHILLIPPS, OF COLUMBUS, NEBRASKA.

SHRUB AND PLANT HOLDER.

1,218,115.   Specification of Letters Patent.   Patented Mar. 6, 1917.

Application filed September 1, 1916. Serial No. 118,109.

*To all whom it may concern:*

Be it known that I, LOUIS F. PHILLIPPS, a citizen of the United States, residing at Columbus, in the county of Platte and State of Nebraska, have invented certain new and useful Improvements in Shrub and Plant Holders; and I do declare the following to be a full, clear, and exact description of the invention, such as will enable others skilled in the art to which it appertains to make and use the same.

This invention relates to new and useful improvements in shrub and plant holders, and the primary object of the invention is to provide an efficient holder to support and protect plants and the like.

Another object of the invention is to provide a new and improved holder of this character which is formed of wire and which is adapted to be formed in sections of various sizes and shapes, the sections being detachably connected and adapted to surround the shrub or plant to be protected.

Another object of the invention is to provide a device of this character which is easily and simply constructed, very economical in manufacture and one which will be very efficient in operation.

With these and numerous other objects in view, my invention consists of the novel features of construction, combination and arrangement of parts which will be herein referred to and more particularly pointed out in the specification and claims.

In the accompanying drawings:

Figure 1 is a perspective view of one form of my improved plant holder, the same being shown applied to use;

Fig. 2 is an enlarged perspective view of one of the sections thereof;

Fig. 3 is a perspective view showing a modified form of my invention;

Fig. 4 is an enlarged detail perspective view of the lower extremity of one of the sections shown in Fig. 3, the strands of wire being shown partially separated;

Fig. 5 is a further modification of my invention;

Fig. 6 is an enlarged perspective of the lower extremity of one of the sections shown in Fig. 5, the strands of wire being shown partially separated.

In describing my invention I shall refer to the drawings in which similar reference characters designate corresponding parts throughout the several views and in which I have shown three different types of plant holders, although this device may be made in various shapes according to the uses to which it is applied. The plant holder is made up of a plurality of sections made from spring wire, which are adapted to be detachably connected so that they may easily surround the plant to be protected and supported.

In Figs. 1 and 2 of the drawings I have shown the simplest form of my invention, which is formed from a single piece of wire designated by the numeral 1, bent intermediately of its ends as shown at 2 and twisted to form a supporting standard 3. The opposite ends of the wire 1 are of unequal length, and one end of the same is bent to form an eye 4 at its upper end, its extremities being wrapped around the standard. The opposite end of the wire is bent loop-shaped as shown at 5 adjacent the eye 4 and is extended around the standard 3, and then projects laterally therefrom as shown at 6. This extension forms a laterally projecting arm and extends from the opposite side of the standard from which the loop 5 projects. The laterally projecting arm may be made in any desired shape, semicircular or straight as desired to suit the uses to which the holder and support is applied. The extremity of the arm 6 is provided with a spring hook 7 for a purpose to be hereinafter more fully described. The completed holder is composed of a plurality of sections similar to those shown in Figs. 1 and 2 of the drawings, and when it is desired to position the same around a plant or shrub to hold and support the same, the standards 3 are forced into the ground at spaced intervals around the base of the plant. The laterally projecting arms 6 are then swung into position and the hooks 7 on the extremities of the same are engaged with the loops 5 of the standards. If desired, the various sections may be assembled before placing the same around the plant, only one of the hooks being left disengaged so that it may be attached when the device is adjusted.

The hooks 7 at the ends of the arms 6 are normally positioned in one direction, but one of the hooks which is designated by the numeral 8 is bent inwardly in the opposite direction, so that the same will interlock with the loop 5 when the adjacent section is brought into engagement therewith. This is clearly shown in Fig. 1 of the drawings, and it will be obvious when the device is locked it will be impossible for the hooks to become disengaged, as the only place the same may be detached is where the hook 8 engages the loop of the adjacent section.

In Figs. 3 and 4 of the drawings I have shown a slightly different type of holder, which in addition to the principle embodied in the form illustrated in Figs. 1 and 2 provides an additional arm spaced beneath the single arm in the other type of holder. This additional arm is formed by taking a single piece of wire designated by the numeral 9 and twisting the same in the standard 3 as shown at 10 and then wrapping the same in a loop spaced beneath the loop 5 of the standard and designated by the numeral 11 in these figures. This loop is formed similar to the loop 5 being extended around the standard and then projecting laterally therefrom to form an arm 12 spaced beneath the arm 6. This arm 12 is also provided with a spring hook 13 similar to the spring hook 7 of the arm.

By this arrangement it will be obvious that the holder may be formed with a pair of projecting arms where it is necessary to use the same and a single arm will not be sufficient to support the plant. This additional arm is easily inserted in the holder when the same is manufactured by the insertion of the additional wire 9 in the standard and twisting the same similar to the formation of the single arm 6. The various sections of this type of device are similar to the method of assembling the sections previously described. It only embodies an additional arm and hook, that are engaged in a similar manner to the engagement of the single arm with the loops of the adjacent sections.

In Figs. 5 and 6 of the drawings I have shown still another arm added to the holder which is formed by taking an additional piece of wire designated by the numeral 14 and twisting the same into engagement with the standard 3, the wire 14 being bent intermediate its ends and the said ends being of unequal length. Along its length which is designated by the numeral 15 is twisted in the form of a loop, that is spaced a predetermined distance below the loop 5 at the top of the standard and said end is then bent around the standard and projects laterally therefrom to form an arm 16. The shorter end of the wire 14 is bent to form a loop 17 spaced beneath loop 15, and is then twisted around the standard in a manner similar to the formation of the previous loops and then extends laterally therefrom to form an additional spaced arm 18. These arms are provided with hooks similar to the hooks previously described, thus it will be seen that by the use of two bent and twisted wires the standard was formed with three projecting arms.

The various sections formed in this manner are connected in a manner similar to the method described with the other type of this device. If desired any number of arms may be used by embodying the particulars above set forth in a formation of the adjacent loops and arms that are adapted to be detachably connected to position the holder around the plant to support the same.

All of the holders are formed with an eye loop at the upper end of the standard, so that the standard may be readily inserted into the ground and may be pushed therein the required distance. When this device is used around a small plant the standards are inserted a considerable distance in the ground and as the plant grows they may be withdrawn accordingly and adjusted to the size of the same.

The arms may be bent in various shapes according to the shape it is desired the holder to assume around the plants that it supports. This holder may be very economically manufactured owing to the fact that it is formed from pieces of wire bent and twisted to the shape above described. When so constructed it will form a very durable and efficient support for various shrubs and plants. The holder may be made in various sizes according to the shrub or plant desired to be supported thereby. Owing to the fact that it is made in sections that are detachably connected any number of sections may be used according to the size of the shrub surrounded.

From the foregoing description of the construction and operation of my improved shrub and plant holder, the manner of applying the same to use and the operation thereof will be readily understood and it will be seen that I have provided a simple and efficient means for carrying out the objects of this invention.

I claim as my invention:

1. A plant holder comprising a plurality of detachable sections, each section consisting of a single piece of wire bent intermediate its ends and tightly twisted from said point a predetermined distance to form a standard, one end of said wire projecting from the termination of its twisted portion in alinement with the standard a short distance, the extremity of said end being bent to form a finger loop with its free end anchored around the adjacent straight portion of the end, the other end of said wire being bent at the termination of its twisted portion to form a laterally projecting U-shaped loop disposed lengthwise in a single plane with the standard, said end of the wire being then wrapped around the straight portion of the other end adjacent the anchored portion of said finger loop and extending outwardly from said straight portion oppositely from the loop to form a straight laterally projecting arm, and a spring hook having a contracted throat portion formed on the extremity of said arm adapted to engage the loop on the adjacent section.

2. A plant holder comprising a plurality of detachable sections, each section consisting of a single piece of wire bent intermediate its ends and tightly twisted from said point a predetermined distance to form a standard, one end of said wire projecting from the termination of its twisted portion in alinement with the standard a short distance, the extremity of said end being bent to form a finger loop with its free end anchored around the adjacent straight portion of the end, the other end of said wire being bent at the termination of its twisted portion to form a laterally projecting substantially U-shaped loop disposed lengthwise in a single plane with the standard, said end of the wire being then wrapped around the straight portion of the other end adjacent the anchored portion of said finger loop and extending outwardly from said straight portion oppositely from the loop to form a straight laterally projecting arm, an additional piece of wire bent intermediate its ends and tightly twisted in said standard, the ends of said additional wire having their twisted portions terminating in spaced relation along the standard, and then bent to form laterally projected substantially U-shaped loops disposed lengthwise in a single plane with the loop on the first mentioned wire, said ends being then looped around the standard and extending outwardly therefrom oppositely from the loops to form straight laterally projecting spaced arms, and spring hooks on the extremities of said arms having contracted throat portions adapted to engage the loops of adjacent sections.

In testimony whereof I have hereunto set my hand in the presence of two subscribing witnesses.

LOUIS FREDERICK PHILLIPPS.

Witnesses:
Gus G. Becher, Jr.,
Adolph Luers.

Copies of this patent may be obtained for five cents each, by addressing the "Commissioner of Patents, Washington, D. C."